US012686555B2

(12) United States Patent
Wilson

(10) Patent No.: US 12,686,555 B2
(45) Date of Patent: Jul. 21, 2026

(54) ROCK BOX DEVICE

(71) Applicant: Jason Wilson, Sioux Falls, SD (US)

(72) Inventor: Jason Wilson, Sioux Falls, SD (US)

(*) Notice: Subject to any disclaimer, the term of this patent is extended or adjusted under 35 U.S.C. 154(b) by 29 days.

(21) Appl. No.: 18/917,516

(22) Filed: Oct. 16, 2024

(65) Prior Publication Data

US 2026/0103334 A1 Apr. 16, 2026

(51) Int. Cl.

| | |
|---|---|
| ***B65D 88/12*** | (2006.01) |
| ***B65D 90/00*** | (2006.01) |
| *B65F 1/12* | (2006.01) |
| *B65F 1/14* | (2006.01) |

(52) U.S. Cl.

CPC ......... *B65D 88/123* (2013.01); *B65D 88/128* (2013.01); *B65D 90/0033* (2013.01); *B65F 1/122* (2013.01); *B65F 1/1452* (2013.01)

(58) Field of Classification Search

CPC B65D 88/123; B65D 90/0033; B65D 88/128; B65F 1/122; B65F 1/1452

USPC ............................................ 220/1.5; 414/498

See application file for complete search history.

(56) References Cited

U.S. PATENT DOCUMENTS

| | | | | |
|---|---|---|---|---|
| 1,145,740 A * | 7/1915 | Bashelier | B62B 1/24 298/2 | |
| 3,984,013 A * | 10/1976 | Wirz | B60P 1/6463 414/498 | |
| 4,723,887 A * | 2/1988 | Swain | B60P 1/04 280/492 | |
| 6,257,358 B1 * | 7/2001 | Roach | B62D 51/04 180/19.1 | |
| 7,520,707 B1 * | 4/2009 | Ness | B65D 88/123 410/31 | |
| 7,874,107 B1 * | 1/2011 | Medley | E04B 1/3444 52/79.5 | |
| 8,789,722 B2 * | 7/2014 | Reuthe | B65D 88/128 220/628 | |
| 8,833,580 B2 * | 9/2014 | Rogers | B65D 90/24 294/68.1 | |

(Continued)

FOREIGN PATENT DOCUMENTS

| | | |
|---|---|---|
| CN | 106677353 | 1/2017 |
| CN | 208430625 | 6/2018 |

(Continued)

OTHER PUBLICATIONS

Primax Shoring Inc / Primax Shoring Bedding Box / www.primaxshoringbedding-box.

*Primary Examiner* — Nathan J Jenness
*Assistant Examiner* — Jennifer Castriotta

(57) ABSTRACT

A rock box device for preventing damage to construction equipment includes a container having a base wall, a rear wall, a pair of side walls, and a front wall. The rear wall is perpendicular to the base wall. The pair of side walls are perpendicular to the base wall. The front wall is angled to extend upwardly from the base wall and outwardly away relative to the rear wall. A pair of supports are coupled to and extend upwardly from the front wall. The pair of supports are perpendicular to the base wall of the container. A handle is coupled to and extends between the pair of supports. The handle is parallel to the base wall of the container. The handle includes a set of tubes and a set of plates that are coupled to and extend around the set of tubes.

15 Claims, 9 Drawing Sheets

(56) References Cited

U.S. PATENT DOCUMENTS

| | | | | |
|---|---|---|---|---|
| 11,752,915 | B1 * | 9/2023 | Burns, Sr. | B60D 1/40 414/408 |
| 2005/0046132 | A1 * | 3/2005 | Dulsky | B62B 3/00 280/79.2 |
| 2009/0014973 | A1 * | 1/2009 | Lawless | B65D 88/129 280/47.26 |
| 2010/0012667 | A1 | 1/2010 | Powell | |
| 2014/0353308 | A1 * | 12/2014 | MacLean | B60P 3/2235 220/1.5 |
| 2024/0034553 | A1 * | 2/2024 | Nahorniak | B65F 1/1405 |

FOREIGN PATENT DOCUMENTS

| | | |
|---|---|---|
| DE | 29520122 | 12/1996 |
| EP | 1401720 | 6/2002 |
| FR | 3107263 | 2/2020 |

* cited by examiner

ROCK BOX DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to aggregate material containers and more particularly pertains to a new aggregate material container for preventing damage to construction equipment.

(2) Description of Related Art Including Information Disclosed Under 37 CFR 1.97 and 1.98

The prior art relates to aggregate material containers. Aggregate material containers, such as bedding boxes or rock boxes, are used to hold and transport aggregates such as gravel, dirt, rocks, and stone, that are used at construction sites. For example, they are commonly placed at the bottom of utility trenches, allowing users to easily access the aggregate material that needs to be placed in such locations. Bedding boxes are constructed with front and rear walls that are angled to extend upwardly relative to the bottom wall and outwardly relative to each other, such that a distance between the front and rear walls, measured parallel to the bottom wall, increases moving upwardly from the bottom wall. This design is currently preferred in the industry because it facilitates easier retrieval of aggregates from the bedding boxes. Specifically, the current design increases the area through which an excavator bucket can move to retrieve the aggregate material. However, this design can also cause damage to the expensive heavy equipment machinery. For example, operators can easily and inadvertently collide the heavy equipment machinery with the angled walls of the bedding box. Thus, there is a need for a redesigned bedding box that is less likely to cause damage.

Bedding boxes also traditionally have handles on at least one of the front and rear walls. The handles extend out beyond the front and rear walls, creating even more risk of accidental collision with the heavy equipment machinery. Thus, there is a need for a bedding box with a handle that is more aligned with the footprint of the bedding box itself to prevent damage to the construction equipment.

The handles are used to move the bedding boxes. For example, a heavy equipment machine may drag, push, or bucket scoop the handle to move the bedding box around the construction site. Unfortunately, this causes significant stress on the handle, which means that the handles often break. The handles are also traditionally constructed in a cylindrical shape, which can make them difficult to maneuver, particularly with the bucket scoop method. Thus, there is a need for an improved construction of the handle that will increase the durability and lifetime of the handle, and that will make the handle easier for heavy equipment machines to maneuver.

BRIEF SUMMARY OF THE INVENTION

An embodiment of the disclosure meets the needs presented above by generally comprising a container having a base wall, a rear wall, a pair of side walls, and a front wall. The rear wall is perpendicular to the base wall. The pair of side walls are perpendicular to the base wall. The front wall is angled to extend upwardly from the base wall and outwardly away relative to the rear wall. A pair of supports are coupled to and extend upwardly from the front wall. The pair of supports are perpendicular to the base wall of the container. A handle is coupled to and extends between the pair of supports. The handle is parallel to the base wall of the container. The handle includes a set of tubes that are coupled together. The set of tubes includes a first pair of tubes that is positioned on top of a second pair of tubes. A set of plates are coupled to and extend around the set of tubes.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
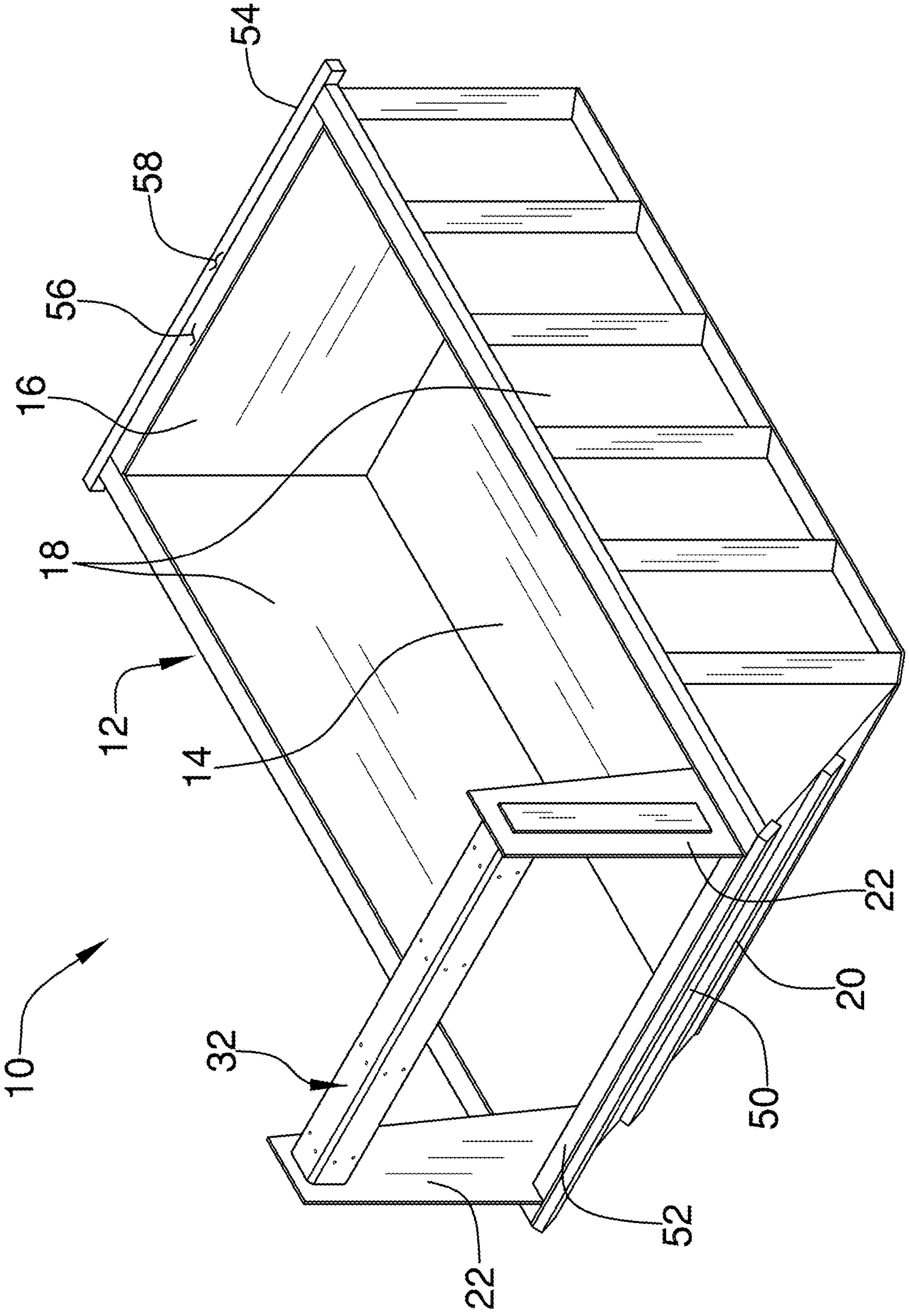
FIG. 1 is a front isometric view of a rock box device according to an embodiment of the disclosure.

With reference now to the drawings, and in particular to FIGS. 1 through 9 thereof, a new aggregate material container embodying the principles and concepts of an embodiment of the disclosure and generally designated by the reference numeral 10 will be described.

As best illustrated in FIGS. 1 through 9, the rock box device 10 generally comprises a container 12, which generally has a base wall 14, a rear wall 16, a pair of side walls 18, and a front wall 20. The rear wall 16 is perpendicular to the base wall 14. The pair of side walls 18 are also perpendicular to the base wall 14. The front wall 20 is angled to extend upwardly from the base wall 14 and outwardly away relative to the rear wall 16. In other words, a distance between the front wall 20 and the rear wall 16 increases moving upwardly away from the base wall 14 when the distance between the front wall 20 and the rear wall 16 is measured parallel to the base wall. The rear wall 16 is generally coupled to and extends upwardly from the base wall 14. The pair of side walls 18 are generally coupled to and extend upwardly from the base wall 14. The pair of side walls 18 are generally coupled to and extend outwardly from the rear wall 16. The pair of side walls 18 are generally perpendicular to the rear wall 16. The front wall 20 is generally coupled to and extends upwardly from the base wall 14. The front wall 20 also generally extends between the pair of side walls 18.

A pair of supports 22 are coupled to and extend upwardly from the front wall 20. The pair of supports 22 are generally perpendicular to the base wall 14 of the container 12. Each support of the pair of supports 22 may be positioned adjacent to a respective side wall of the pair of side walls 18. Each support of the pair of supports 22 may be planar.

For example, each support of the pair of supports 22 may include a lower edge 24 that extends along an inner surface 48 of the front wall 20. The lower edge 24 may be angled to extend upwardly relative to the base wall 14 and forwardly along the front wall 20 such that a distance between the lower edge 24 and the rear wall 16 increases moving upwardly away from the base wall 14, when the distance between the lower edge 24 of each support of the pair of supports 22 and the rear wall 16 is measured parallel to the base wall 14.

A first lateral edge 26 may be coupled to and extend upwardly from the lower edge 24. The first lateral edge 26 may be perpendicular to the base wall 14 of the container 12. The first lateral edge 26 may be positioned proximate to an outer surface 50 of the front wall 20. For example, the first lateral edge 26 may be positioned on an upper end 52 of the front wall 20, adjacent to the outer surface 50, as shown in FIG. 1.

Figure 2:
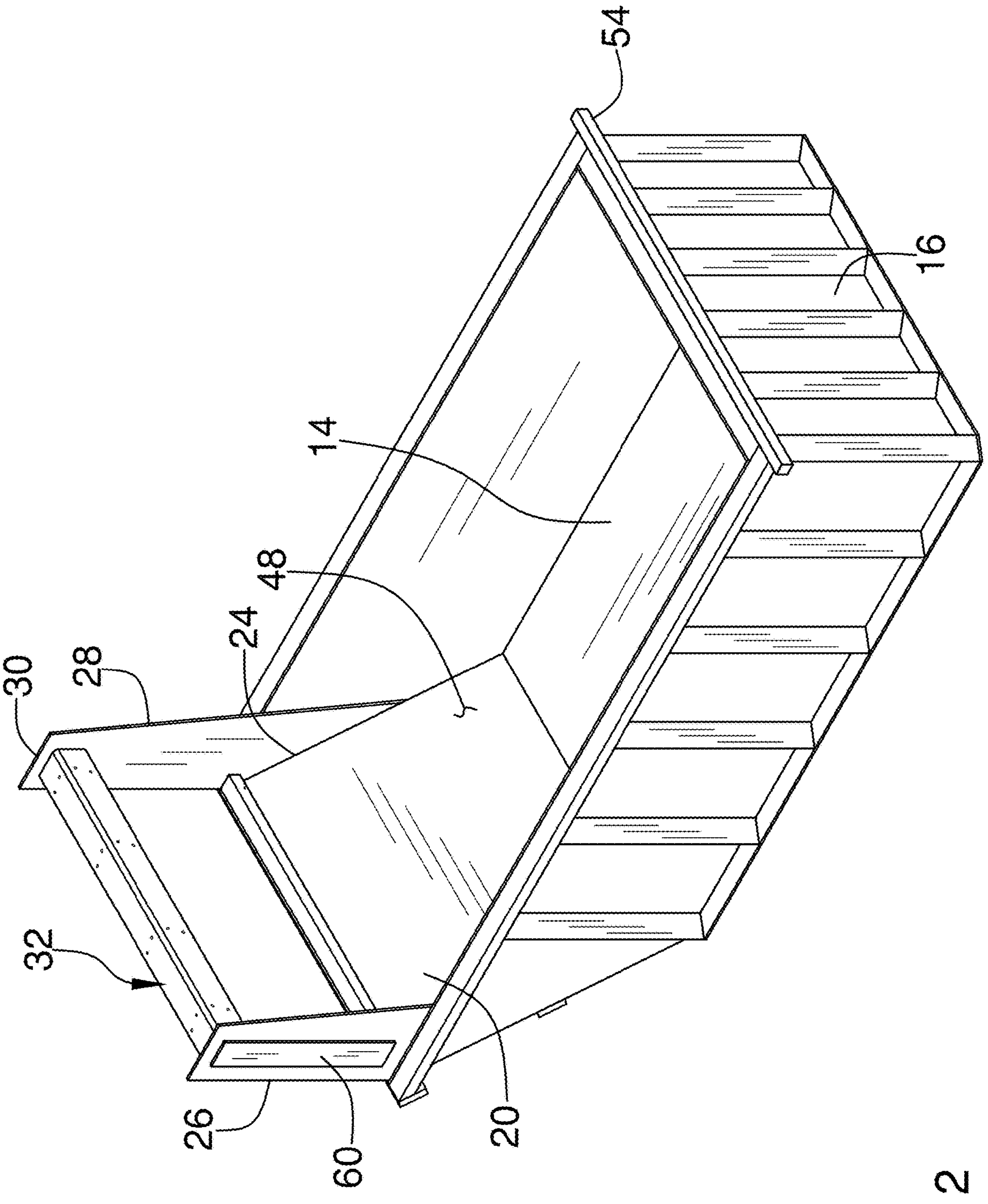
FIG. 2 is a rear isometric view of an embodiment of the disclosure.
Figure 3:
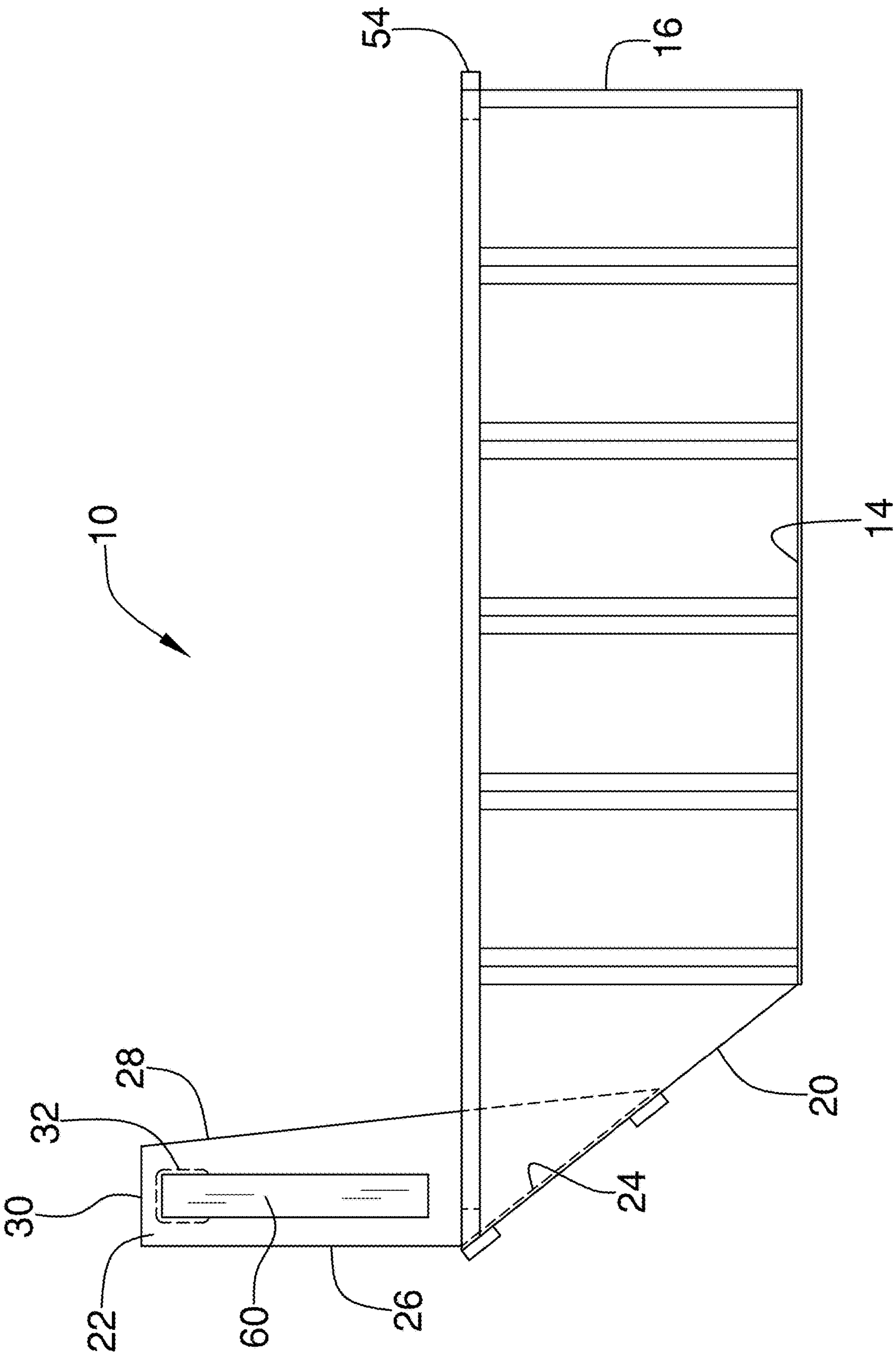
FIG. 3 is a side view of an embodiment of the disclosure.
Figure 4:
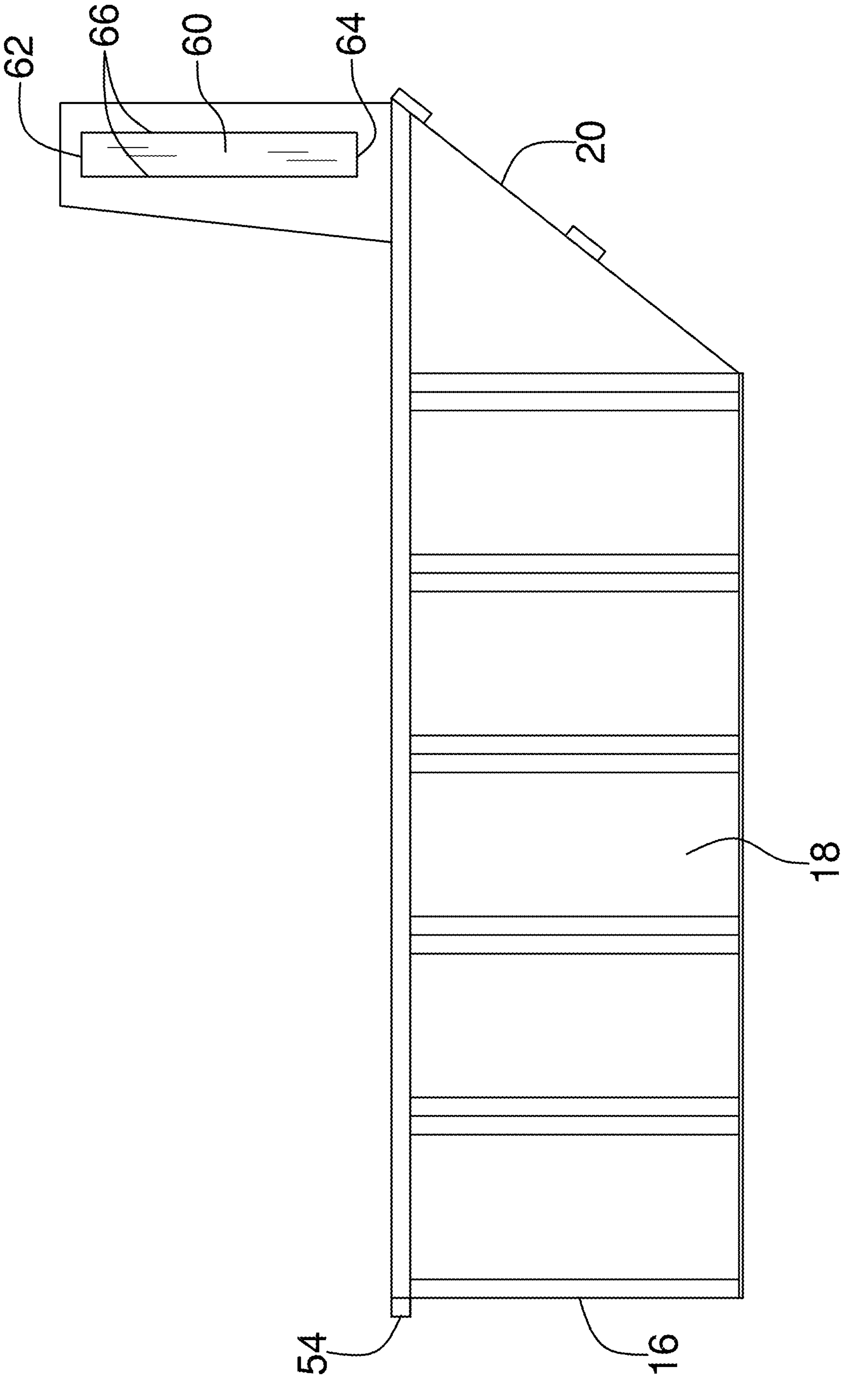
FIG. 4 is a side view of an embodiment of the disclosure.
Figure 5:
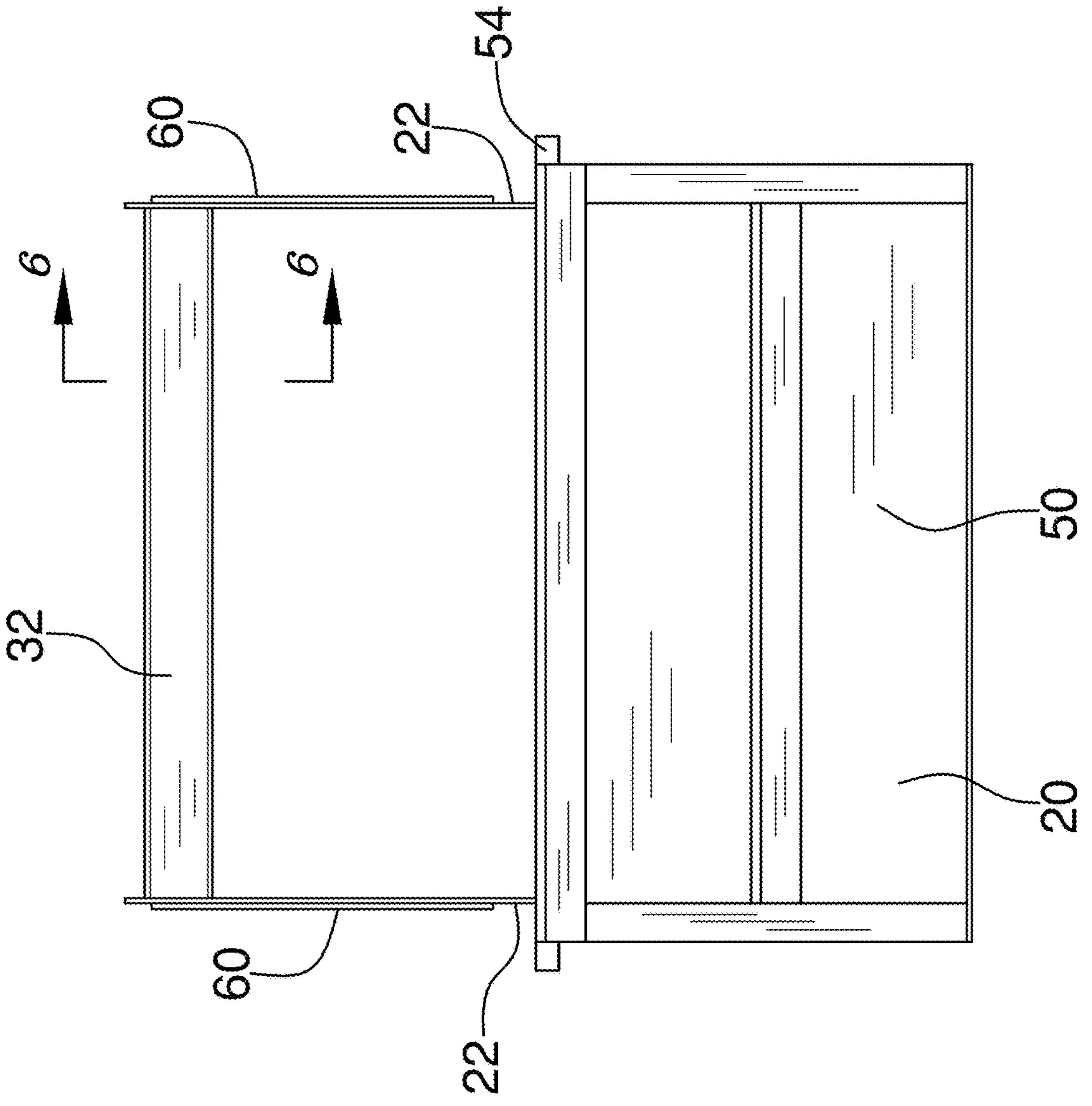
FIG. 5 is a front view of an embodiment of the disclosure.

A second lateral edge 28 may be coupled to and extend upwardly from the lower edge 24. The second lateral edge 28 may be distally positioned on the lower edge 24 relative to the first lateral edge 26. The second lateral edge 28 may have a height exceeding a height of the first lateral edge 26. The second lateral edge 28 may be positioned to intersect the inner surface 48 of the front wall 20 wherein the second lateral edge 28 is positioned between the first lateral edge 26 of each support of the pair of supports 22 and the rear wall 16 of the container 12. The second lateral edge 28 may be spaced from the base wall 14 of the container 12, as shown in FIGS. 2 and 3.

An upper edge 30 may be coupled to and extend between the first lateral edge 26 and the second lateral edge 28. The upper edge 30 may be parallel to the base wall 14 of the container 12.

A handle 32 is coupled to and extends between the pair of supports 22. The handle 32 is generally parallel to the base wall 14 of the container 12 wherein the handle 32 is perpendicular to the pair of supports 22. The handle 32 may be positioned proximate to the upper edge 30 of each support of the pair of supports 22. The handle 32 may be centered between the first lateral edge 26 and the second lateral edge 28 of each support of the pair of supports 22.

The handle 32 may be rectangular wherein the handle 32 is configured to facilitate a heavy equipment machine such as a loader in hooking the handle 32 using a bucket of the heavy equipment machine, for example to move the container 12. The rectangular shape of the handle 32 is also configured to facilitate the heavy equipment machine in pushing or pulling on the handle 32 to move the container 12, for example because the handle 32 includes a plurality of planar faces which are perpendicular to each other. More specifically, the planar faces of the handle 32 provide a flat surface against which the bucket of the heavy equipment machine can be positioned to move the container 12.

The handle 32 generally includes a set of tubes 34 that are coupled together. In preferred embodiments, the set of tubes 34 are welded together, as described in more detail below. Each tube of the set of tubes 34 may be hollow. Each tube of the set of tubes 34 may be rectangular wherein the set of tubes 34 are configured to define the rectangular shape of the handle 32 when the set of tubes 34 are coupled together. For example, the set of tubes 34 may include a first pair of tubes 36 that are positioned on top of a second pair of tubes 38. The first pair of tubes 36 are generally parallel to the second set of tubes 38. The set of tubes 34 generally have uniform dimensions. More specifically, each tube of the set of tubes 34 generally includes a length, a width, a height, and a weight that is the same as all other tubes of the set of tubes 34. Each tube of the set of tubes 34 may include a steel material.

A set of plates 40 are coupled to and extend around the set of tubes 34. In preferred embodiments, the set of plates 40 are welded to the set of tubes 34. Each plate of the set of plates 40 is generally rectangular, to ensure the rectangular shape of the handle 32. Each plate of the set of plates 40 may include the steel material. The set of plates 40 generally includes four plates. Each plate of the set of plates 40 may be welded to an adjacent plate of the set of plates 40, for example along an elongated edge 46 of each plate of the set of plates 40. Each plate of the set of plates 40 may be planar.

A plurality of holes 42 may extend through each plate of the set of plates 40. The plurality of holes 42 are generally spaced from each other along a length of each plate of the set of plates 40. The plurality of holes 42 are generally configured to receive a weld material 44 to facilitate plug welding of the set of plates 40 to the set of tubes 34.

A rail 54 may be coupled to the rear wall 16 of the container 12. The rail 54 generally has a length exceeding a length of the rear wall 16 wherein the rail 54 extends outwardly from the rear wall 16 past each side wall of the pair of side walls 18. The rail 54 may be parallel to the handle 32. The rail 54 may be positioned adjacent to a top surface 56 of the rear wall 16 wherein an upper surface 58 of the rail 54 is coplanar with the top surface 56 of the rear wall 16.

A pair of panels 60 may be coupled to the pair of supports 22 wherein each panel of the pair of panels 60 is positioned on a respective support of the pair of supports 22. The respective support is generally positioned between each panel and the handle 32. The pair of panels 60 are generally configured to reinforce the handle 32.

Each panel of the pair of panels 60 may include a primary edge 62 that is positioned proximate to the upper edge 30 of the respective support. The primary edge may be positioned proximate to a junction between the handle 32 and the respective support wherein each panel overlaps the area of the respective support where the handle 32 is positioned. The primary edge 62 may have a length that is between 5.0 inches and 7.0 inches. In other words, each panel may have a width that is between 5.0 inches and 7.0 inches. The primary edge 62 may be parallel to the upper edge 30 of the respective support.

A secondary edge 64 may be positioned proximate to the container 12 wherein each panel of the pair of panels 60 is elongated between the primary edge 62 and the secondary edge 64. The secondary edge 64 may have a length that is equal to a length of the primary edge. As described above, the length of each of the primary edge 62 and the secondary edge 64 generally defines a width of each panel of the pair of panels 60.

A pair of side edges 66 may extend between the primary edge 62 and the secondary edge 64. Each side edge of the pair of side edges 66 may have a length that is between 18.0 inches and 30.0 inches. The length of the pair of side edges 66 generally defines a length of each panel of the pair of panels 60. Each panel of the pair of panels 60 may have a thickness measured perpendicularly to the primary edge 62 that is between 0.25 inches and 0.75 inches. Each panel of the pair of panels 60 may include a steel material.

In use, the container 12 can provide storage of aggregate material, for example at a construction site. Because each of the rear wall 16 and the pair of side walls 18 of the container 12 are perpendicular to the base wall 14, there is less likelihood of accidental collision with the container 12 compared to prior art bedding boxes. Additionally, because the pair of supports 22 are perpendicular to the base wall 14 of the container 12, the handle 32 is positioned above the container 12, instead of is positioned in front of the container 12 as with previous designs. Positioning the handle 32 above the container 12 also leads to fewer collisions with the bedding box and less damage to the construction equipment.

Figure 6:
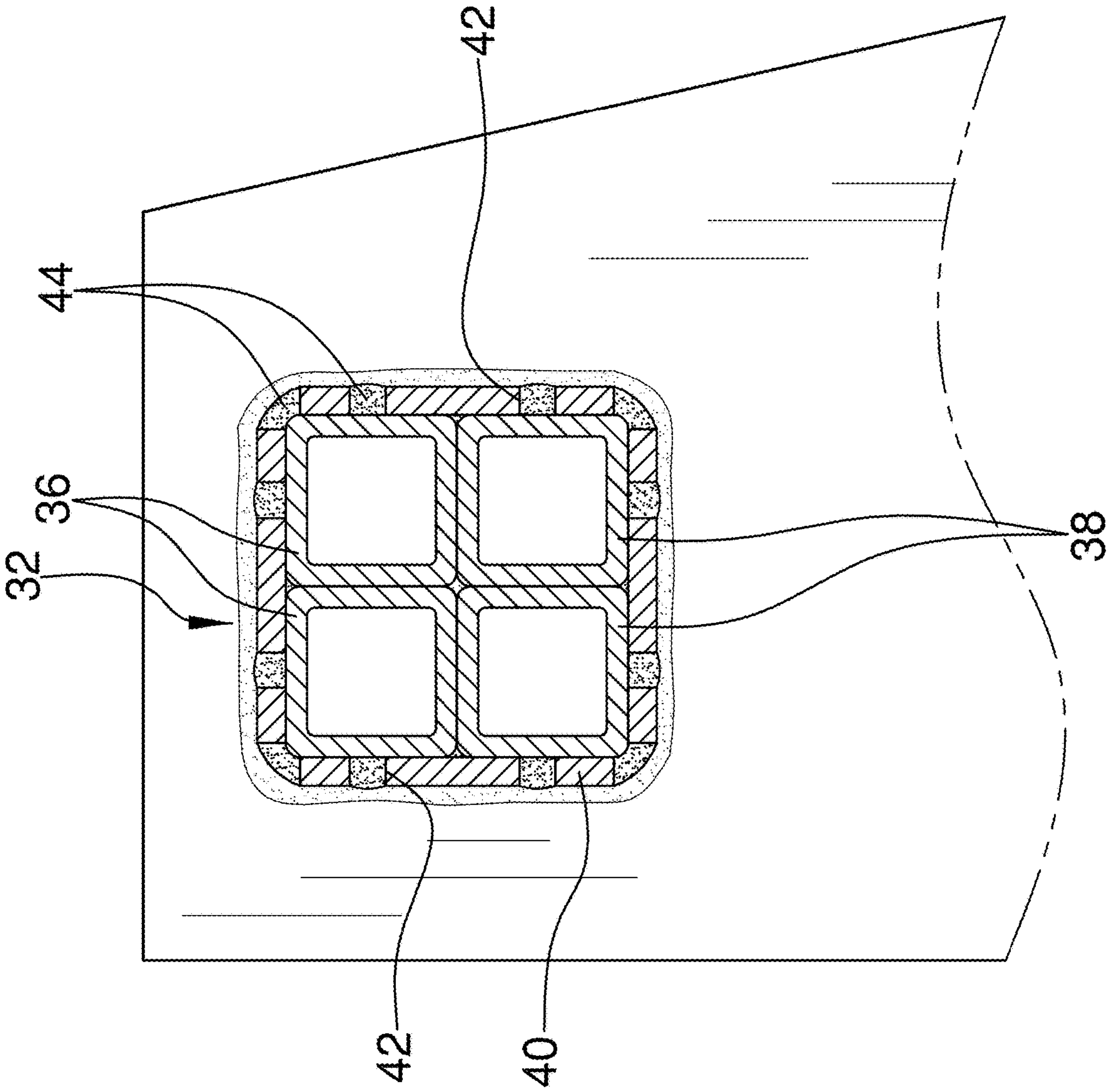
FIG. 6 is a cross-sectional view of an embodiment of the disclosure.
Figure 7:
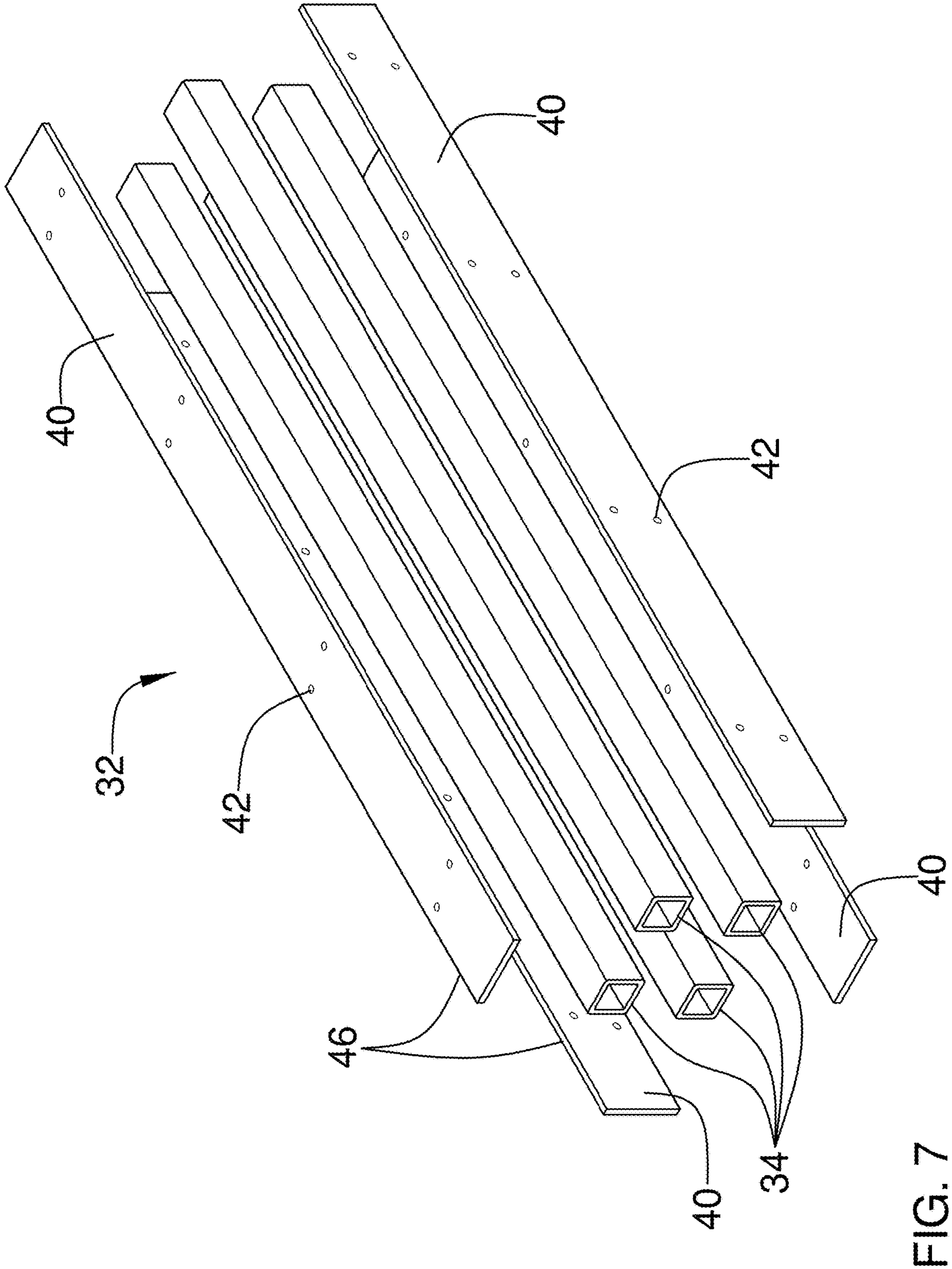
FIG. 7 is a detail isometric view of an embodiment of the disclosure.
Figure 8:
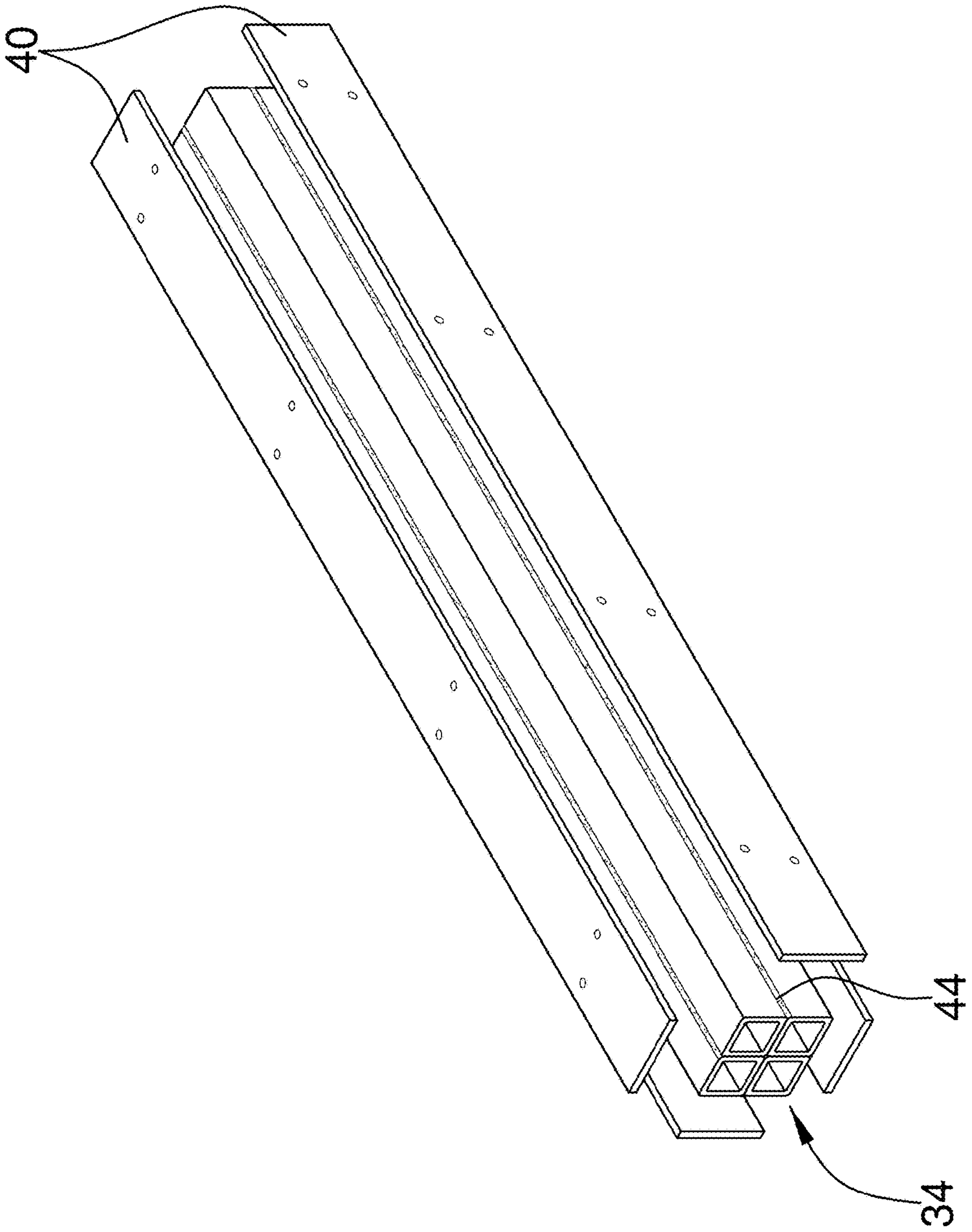
FIG. 8 is a detail isometric view of an embodiment of the disclosure.
Figure 9:
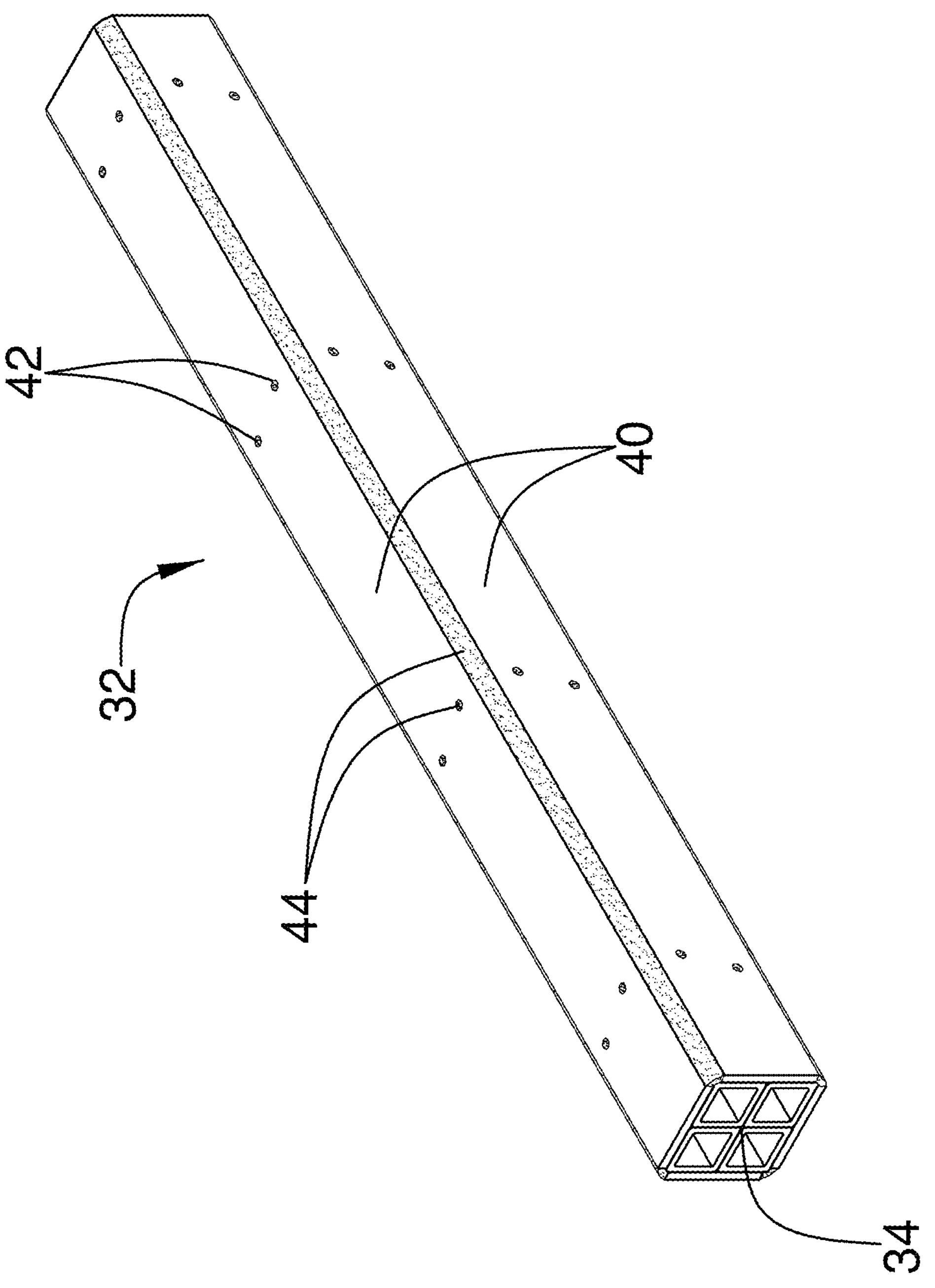
FIG. 9 is a detail isometric view of an embodiment of the disclosure.

The handle 32 may be made by welding the set of tubes 34 and the set of plates 40 together. As shown in FIGS. 6-8, the set of tubes 34 can be positioned with the first pair of tubes 36 on top of the second pair of tubes 38. The first pair of tubes 36 can be welded together along intersecting faces of each tube of the first pair of tubes 36. Similarly, the second pair of tubes 38 can be welded together along intersecting faces of each tube of the second pair of tubes 38. Then, the lower faces of the first pair of tubes 36 can be welded to the upper faces of the second pair of tubes 38, as shown in FIG. 6. The set of plates 40 can then be positioned to surround the set of tubes 34. As shown in FIG. 8, the set of plates 40 can be welded together along the elongated edge 46 of each plate of the set of plates 40. The weld material 44 can also be used to fill each hole of the plurality of holes 42, plug welding the set of plates 40 to the set of tubes 34. This technique increases the strength and durability of the handle 32 compared to previous designs. Additionally, because each tube of the set of tubes 34 is hollow, the weight of the handle 32 is minimized to reduce strain on the heavy equipment machines is used to move the container 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A bedding box assembly comprising:

a container having a base wall, a rear wall, a pair of side walls, and a front wall, the rear wall being perpendicular to the base wall, the pair of side walls being perpendicular to the base wall, the front wall being angled to extend upwardly from the base wall and outwardly away relative to the rear wall; and a pair of supports being coupled to and extending upwardly from the front wall, the pair of supports being perpendicular to the base wall of the container; and a handle being coupled to and extending between the pair of supports, the handle being parallel to the base wall of the container, the handle including:

a set of tubes being coupled together, the set of tubes including a first pair of tubes being positioned on top of a second pair of tubes; and a set of plates being coupled to and extending around the set of tubes.

2. The bedding box assembly of claim 1, wherein each support of the pair of supports is positioned adjacent to a respective side wall of the pair of side walls of the container.

3. The bedding box assembly of claim 1, wherein each support of the pair of supports is planar.

4. The bedding box assembly of claim 3, wherein each support of the pair of supports further comprises:

a lower edge extending along an inner surface of the front wall;

a first lateral edge being coupled to and extending upwardly from the lower edge, the first lateral edge being positioned proximate to an outer surface of the front wall;

a second lateral edge being coupled to and extending upwardly from the lower edge, the second lateral edge being positioned to intersect the inner surface of the front wall wherein the second lateral edge is positioned between the first lateral edge of each support of the pair of supports and the rear wall of the container; and an upper edge being coupled to and extending between the first lateral edge and the second lateral edge.

5. The bedding box assembly of claim 4, wherein the first lateral edge is perpendicular to the base wall of the container.

6. The bedding box assembly of claim 4, wherein the second lateral edge has a height exceeding a height of the first lateral edge.

7. The bedding box assembly of claim 4, wherein the second lateral edge is spaced from the base wall of the container.

8. The bedding box assembly of claim 4, wherein the upper edge is parallel to the base wall of the container.

9. The bedding box assembly of claim 1, wherein each tube of the set of tubes is hollow.

10. The bedding box assembly of claim 1, wherein each tube of the set of tubes is rectangular wherein the handle is configured to facilitate a heavy equipment machine in hooking the handle to move the container.

11. The bedding box assembly of claim 10, wherein the set of plates includes four plates.

12. The bedding box assembly of claim 11, wherein each plate of the set of plates is welded to an adjacent plate of the set of plates along an elongated edge of each plate of the set of plates.

13. The bedding box assembly of claim 1, further comprising a plurality of holes extending through each plate of the set of plates.

14. The bedding box assembly of claim 13, further comprising a weld material being positioned within each hole of the set of plates such that the set of plates are plug welded to the set of tubes.

15. A bedding box assembly comprising:

a container having a base wall, a rear wall, a pair of side walls, and a front wall, the rear wall being perpendicular to the base wall, the pair of side walls being perpendicular to the base wall, the front wall being angled to extend upwardly from the base wall and outwardly away relative to the rear wall such that a distance between the front wall and the rear wall parallel to the base wall increases moving upwardly away from the base wall, the rear wall being coupled to and extending upwardly from the base wall, the pair of side walls being coupled to and extending upwardly from the base wall, the pair of side walls being coupled to and extending outwardly from the rear wall, the pair of side walls being perpendicular to the rear wall, the front wall being coupled to and extending upwardly from the base wall, the front wall extending between the pair of side walls; and a pair of supports being coupled to and extending upwardly from the front wall, the pair of supports being perpendicular to the base wall of the container, each support of the pair of supports being positioned adjacent to a respective side wall of the pair of side walls, each support of the pair of supports being planar, each support of the pair of supports including:

a lower edge extending along an inner surface of the front wall wherein the lower edge is angled to extend upwardly relative to the base wall and forwardly along the front wall such that a distance between the lower edge and the rear wall parallel to the base wall increases moving upwardly away from the base wall;

a first lateral edge being coupled to and extending upwardly from the lower edge, the first lateral edge being perpendicular to the base wall of the container, the first lateral edge being positioned proximate to an outer surface of the front wall;

a second lateral edge being coupled to and extending upwardly from the lower edge, the second lateral edge being distally positioned on the lower edge relative to the first lateral edge, the second lateral edge having a height exceeding a height of the first lateral edge, the second lateral edge being positioned to intersect the inner surface of the front wall wherein the second lateral edge is positioned between the first lateral edge of each support of the pair of supports and the rear wall of the container, the second lateral edge being spaced from the base wall of the container; and an upper edge being coupled to and extending between the first lateral edge and the second lateral edge, the upper edge being parallel to the base wall of the container;

a handle being coupled to and extending between the pair of supports, the handle being parallel to the base wall of the container wherein the handle is perpendicular to the pair of supports, the handle including:

a set of tubes being coupled together, each tube of the set of tubes being hollow, each tube of the set of tubes being rectangular, the set of tubes including a first pair of tubes being positioned on top of a second pair of tubes wherein the set of tubes is rectangular, the set of tubes having uniform dimensions;

a set of plates being coupled to and extending around the set of tubes, each plate of the set of plates being rectangular, each plate of the set of plates comprising a steel material, the set of plates including four plates, each plate of the set of plates being welded to an adjacent plate of the set of plates along an elongated edge of each plate of the set of plates; and a plurality of holes extending through each plate of the set of plates, the plurality of holes being spaced from each other along a length of each plate of the set of plates wherein the plurality of holes are configured to receive a weld material to facilitate plug welding of the set of plates to the set of tubes;

a rail being coupled to the rear wall of the container, the rail having a length exceeding a length of the rear wall wherein the rail extends outwardly from the rear wall past each side wall of the pair of side walls, the rail being parallel to the handle, the rail being positioned adjacent to a top surface of the rear wall wherein an upper surface of the rail is coplanar with the top surface of the rear wall; and a pair of panels being coupled to the pair of supports wherein each panel of the pair of panels is positioned on a respective support of the pair of supports, the respective support being positioned between each panel and the handle wherein the pair of panels are configured to reinforce the handle, each panel of the pair of panels including:

a primary edge being positioned proximate to the upper edge of the respective support wherein the primary edge is positioned proximate to a junction between the handle and the respective support;

a secondary edge being positioned proximate to the container wherein each panel of the pair of panels is elongated between the primary edge and the secondary edge; and a pair of side edges extending between the primary edge and the secondary edge.

* * * * *